(12) United States Patent
Manickam et al.

(10) Patent No.: US 10,902,587 B2
(45) Date of Patent: Jan. 26, 2021

(54) METHODS AND SYSTEMS FOR LABELING WHOLE SPINE IMAGE USING DEEP NEURAL NETWORK

(71) Applicant: GE Precision Healthcare LLC, Wauwatosa, WI (US)

(72) Inventors: Kavitha Manickam, Bangalore (IN); Jignesh Dholakia, Bangalore (IN); Vignesh Singh, Bangalore (IN); Sandeep Lakshmipathy, Bangalore (IN)

(73) Assignee: GE Precision Healthcare LLC, Wauwatosa, WI (US)

( * ) Notice: Subject to any disclaimer, the term of this patent is extended or adjusted under 35 U.S.C. 154(b) by 236 days.

(21) Appl. No.: 15/994,411

(22) Filed: May 31, 2018

(65) Prior Publication Data
US 2019/0370957 A1 Dec. 5, 2019

(51) Int. Cl.
| G06K 9/00 | (2006.01) |
| G06T 7/00 | (2017.01) |
| G06K 9/66 | (2006.01) |
| G06T 7/10 | (2017.01) |
| G06N 3/08 | (2006.01) |

(52) U.S. Cl.
CPC ........... *G06T 7/0012* (2013.01); *G06K 9/66* (2013.01); *G06N 3/08* (2013.01); *G06T 7/10* (2017.01); *G06T 2207/20081* (2013.01); *G06T 2207/20084* (2013.01); *G06T 2207/30012* (2013.01)

(58) Field of Classification Search
CPC ............... G06T 7/0012; G06T 7/10; G06T 2207/20081; G06T 2207/30012; G06T 2207/20084; G06N 3/08; G06K 9/66; G06K 2209/055; G06K 9/6273; G06K 9/4628
USPC ........................................... 382/128
See application file for complete search history.

(56) References Cited

U.S. PATENT DOCUMENTS

| 5,570,404 A * | 10/1996 | Liang ............... A61B 6/504 378/8 |
| 2007/0092121 A1 * | 4/2007 | Periaswamy ........ G06T 7/12 382/128 |

(Continued)

OTHER PUBLICATIONS

Garcia-Garcia et al., A Review on Deep Learning Techniques Applied to Semantic Segmentation, arXiv:1704.06857v1, Apr. 22, 2017, 23 Pages.

(Continued)

*Primary Examiner* — Van D Huynh
(74) *Attorney, Agent, or Firm* — Armstrong Teasdale LLP

(57) ABSTRACT

A method and system for automatically labeling a spine image is disclosed. The method includes receiving an input spine image and analyzing image features of the input spine image by a deep neural network. The method further includes generating a mask image corresponding to the input spine image by the deep neural network based on image characteristics of a training image dataset. A region of interest in the mask image comprises vertebral candidates of the spine. The training image dataset comprises a plurality of spine images and a plurality of corresponding mask images. The method further includes associating labels with a plurality of image components of the mask image and labeling the input spine image based on labels associated with the mask image.

19 Claims, 14 Drawing Sheets

(56) References Cited

U.S. PATENT DOCUMENTS

| | | | | |
|---|---|---|---|---|
| 2008/0044074 | A1* | 2/2008 | Jerebko | G06T 7/149 |
| | | | | 382/128 |
| 2014/0003684 | A1* | 1/2014 | Ayed | G06T 7/136 |
| | | | | 382/128 |
| 2015/0003695 | A1* | 1/2015 | Ayed | G06T 7/0014 |
| | | | | 382/128 |
| 2017/0032518 | A1* | 2/2017 | Behrooz | A61B 6/032 |
| 2018/0260951 | A1* | 9/2018 | Yang | G06K 9/00718 |
| 2018/0365876 | A1* | 12/2018 | Wimmer | G06T 7/33 |
| 2019/0035085 | A1* | 1/2019 | Yu | G06K 9/34 |
| 2020/0069243 | A1* | 3/2020 | Matsumoto | A61B 5/1071 |

OTHER PUBLICATIONS

Forsberg et al., Detection and Labeling of Vertebrae in MR Images Using Deep Learning with Clinical Annotations as Training Data, Society for Imaging Informatics in Medicine, 2017, 7 Pages.

Chu et al., Fully Automatic Localization and Segmentation of 3D Vertebral Bodies from CT/MR Images via a Learning-Based Method, PLOS ONE | DOI:10.1371/journal.pone.0143327, Nov. 23, 2015, 22 Pages.

Kalinovsky et al., Lung Image Segmentation Using Deep Learning Methods and Convolutional Neural Networks, https://www.researchgate.net/publication/301927359, Oct. 2016, 5 Pages.

Ling et al., Semi-automated Vertebral Segmentation of Human Spine in MRI Images, 2016 International Conference on Advances in Electrical, Electronic and System Engineering, Nov. 14-16, 2016, 5 Pages.

Ronneberger et al., U-Net: Convolutional Networks for Biomedical Image Segmentation, Computer Science Department and BIOSS Centre for Biological Signalling Studies, University of Freiburg, Germany, arXiv:1505.04597v1, May 18, 2015, 8 Pages.

* cited by examiner

METHODS AND SYSTEMS FOR LABELING WHOLE SPINE IMAGE USING DEEP NEURAL NETWORK

TECHNICAL FIELD

Embodiments of the present specification relate to generally methods and systems for automatically labeling a spine image, and more specifically to labeling a whole spine image using a deep neural network.

BACKGROUND OF THE INVENTION

Spine images may be obtained to detect spine pathologies that affects the appearance of the spine such as fracture, neoplasm, scoliosis, and inter-vertebral degeneration and protrusion. Thus, precision detection and identification of spine structures such as, vertebrae and discs are necessary. Spine images are manually annotated and/or labelled to identify the vertebrae and discs. There are also techniques available that semi-automatically annotates and/or labels the vertebrae and discs. For example, a radiologist or technician manually marks top and lower vertebrae of spine for each slice for the annotation tool to label all the vertebrae. The labels are reviewed by the radiologist or technician. If the radiologist marks a starting portion of spine for example, lumbar, the annotation tool shows the labels for remaining spine vertebrae. However, when there are anatomical or pathological variations in the spine, such as scoliosis spines (abnormal curvature in spine), fused vertebrae, trauma induced anatomy changes, spine implants, transitional vertebrae and lumbar sacralization, the annotation tool may fail to provide labels accurately.

It is generally desirable to have a tool for labeling spine image accurately.

BRIEF DESCRIPTION

One embodiment of the present disclosure relates to a method for automatically labeling a spine image. The method includes receiving an input spine image and analyzing image features of the input spine image by a deep neural network. The method further includes generating a mask image corresponding to the input spine image by the deep neural network based on image characteristics of a training image dataset. A region of interest in the mask image comprises vertebral candidates of the spine. The training image dataset comprises a plurality of spine images and a plurality of corresponding mask images. The method further includes associating labels with a plurality of image components of the mask image and labeling the input spine image based on labels associated with the mask image.

In another embodiment, a method for training a deep neural network is disclosed. The method includes providing a training image dataset to the deep neural network. The training image dataset comprises a plurality of spine images and a plurality of corresponding mask images. Each spine image of the plurality of spine images is of a whole spine anatomy. The method further includes training the deep neural network on weights assigned to the image characteristics by correlating the image characteristics of each spine image in the training image dataset with a corresponding mask image in the training image dataset. A region of interest in the mask image comprises vertebral candidates of a spine. The method also comprises learning, by the deep neural network, a relationship between the spine image and the corresponding mask image in the training image dataset based on the training.

In yet another embodiment, a system for automatically labeling a spine image is disclosed. The system comprises a deep neural network framework configured to analyze image features of an input spine image and generate a mask image corresponding to the input spine image based on image characteristics of a training image dataset. A region of interest in the mask image comprises vertebral candidates of the spine. The training image dataset comprises a plurality of spine images and a plurality of corresponding mask images. The deep neural network is further configured to associate labels with a plurality of image components of the mask image corresponding to the input spine image; and label the input spine image based on the labels associated with the mask image.

A more complete understanding of the present disclosure, as well as further features and advantages thereof, will be obtained by reference to the following detailed description and drawings.

DETAILED DESCRIPTION OF THE INVENTION

Figure 1:
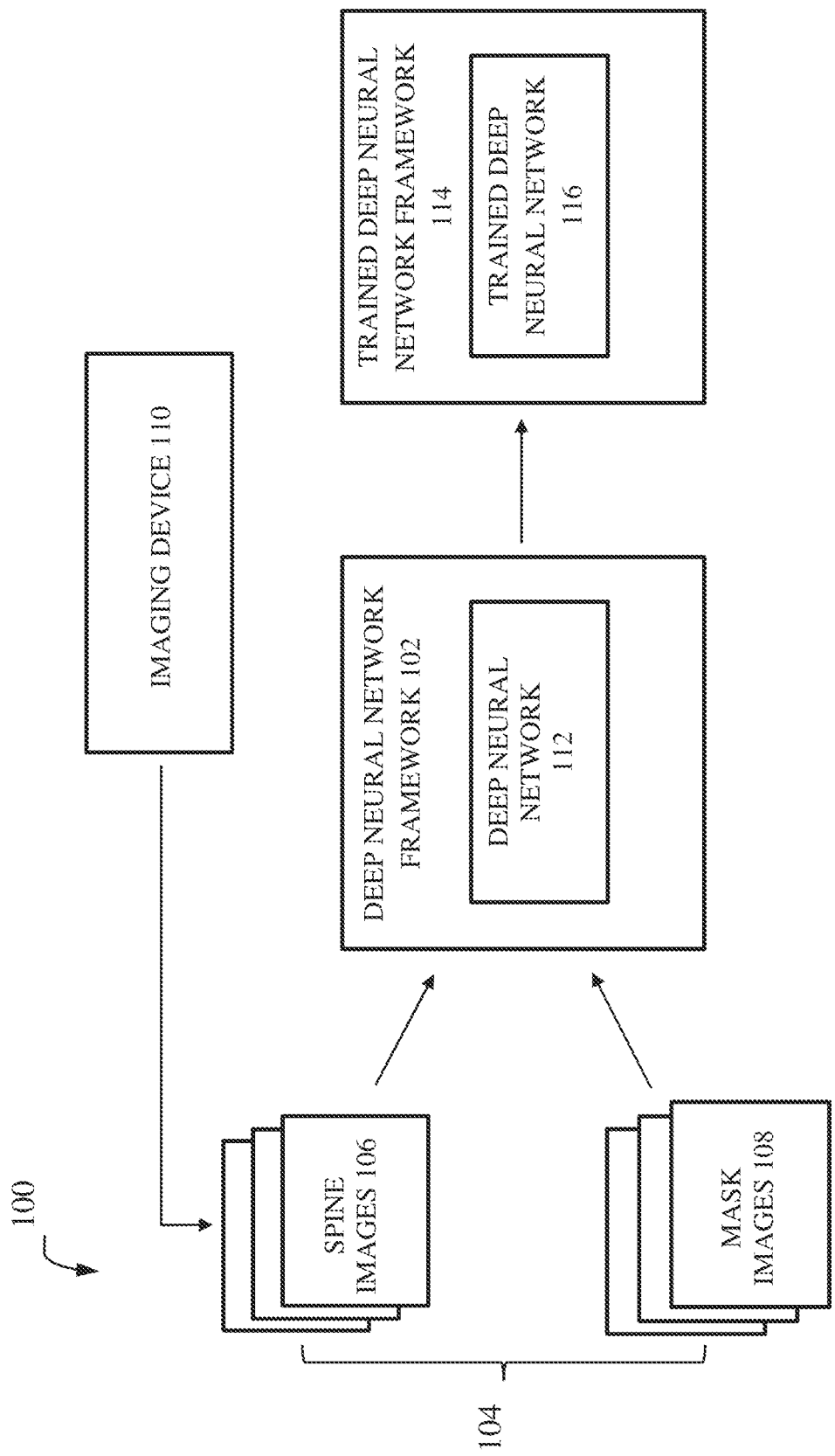
FIG. 1 illustrates schematically a system for labeling an input spine image in accordance with an embodiment.

The following detailed description of certain embodiments will be better understood when read in conjunction with the appended drawings. To the extent that the figures illustrate diagrams of the functional modules of various embodiments, the functional blocks are not necessarily indicative of the division between hardware circuitry. Thus, for example, one or more of the functional blocks (e.g., processors or memories) may be implemented in a single piece of hardware (e.g., a general-purpose signal processor or a block of random access memory, hard disk, or the like) or GPU (Graphics processing unit) or distributed hardware (distributed across GPU/CPU, GPU+CPU). Similarly, the programs may be stand-alone programs, may be incorporated as subroutines in an operating system, may be functions in an installed software package, residing in cloud based software/program, residing in edge/fog machine software, and so on. It should be understood that the various embodiments are not limited to the arrangements and instrumentality shown in the drawings.

One or more specific embodiments of the present disclosure are described below in order to provide a thorough understanding. These described embodiments are only examples of method and system for labeling a spine image. Moreover, as will be understood, embodiments of the invention are not limited to neural networks and, accordingly, may include other forms of artificial intelligence. The skilled artisan will understand that specific details described in the embodiments can be modified when being placed into practice without deviating from the spirit of the present disclosure.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object.

In addition, it should be understood that references to "one embodiment" or "an embodiment" of the present disclosure are not intended to be interpreted as excluding the existence of additional embodiments that also incorporate the recited features. Further, the limitations of the following claims are not written in means-plus-function format and are not intended to be interpreted as such, unless and until such claim limitations expressly use the phrase "means for" followed by a statement of function void of further structure.

As discussed in detail below are embodiments of a method of labeling a spine image. The method includes receiving an input spine image. The method further includes analyzing image features of the input spine image using a deep neural network. The method further includes generating a mask image corresponding to the input spine image by the deep neural network based on image characteristics of a training image dataset, wherein a region of interest in the mask image comprises vertebral candidates of the spine, wherein the training image dataset comprises a plurality of spine images and a plurality of mask images. The method further includes processing the mask image to associate labels to the mask image. The method further includes labelling the input spine image based on labels associated to the mask image.

FIG. 1 illustrates schematically a system 100 for automatically labeling an input spine image in accordance with an embodiment of the invention. The system 100 includes a deep neural network framework 102 receiving or is provided with a training image dataset 104. The training image dataset 104 comprises a plurality of spine images 106 and a plurality of mask images 108. The plurality of spine images 106 may be generated by one or more imaging devices, for example an imaging device 110. In an embodiment the imaging device 110 may be a magnetic resonance imaging device. However, it may be noted that an imaging device (for example, the imaging device 110) may be any other imaging devices such as computed tomography imaging devices, according to other embodiments. A mask image may be generated from a spine image and it has a region of interest that includes vertebral candidates of the spine. In an embodiment, the spine image may be of a whole spine anatomy. So, the mask image generated may be of a whole spine with all vertebrae. In another embodiment, the spine image may be a portion of the spine and hence mask image is also a portion of the spine. As used herein, the term "mask image" refers to an image wherein some pixel values of image are changed to zero value or set to some background value, and others are set to non-zero value(s). For example, an MR spine image may include structure of the spine, skull and other tissues, and a mask image generated from the MR spine image only shows the spine. Here, the pixel values of image pixels associated with skull and other tissues are changed to a zero value and pixel values of the image pixels of spine are retained as non-zero value for example, 1. Therefore, in the training image dataset 104 a mask image may have a corresponding spine image. In an embodiment, the mask image may be generated from a corresponding spine image by a user.

The deep neural network framework 102 includes a deep neural network 112 which is trained by the training image dataset 104. The deep neural network 112 gets trained on weights assigned to image characteristics of a spine image of the plurality of spine images 106 by correlating the image characteristics of the spine image and image characteristics of a mask image of the plurality of mask images 108. The image characteristics of a spine image and mask image may include but are not limited to, pixel value, pixel intensity, location, color, orientation and tone. During the training, the deep neural network 112 learns a relationship between the spine image and a corresponding mask image. The relationship indicates that mask image is associated with a particular spine image. For example, if a spine image includes a fused vertebra, the deep neural network finds a mask image having an identical fused vertebra from a plurality of mask images to learn the relationship. As result of training, a trained deep neural network 114 including a trained deep neural network 116 is generated. This is explained in more detail with respect to FIGS. 3-5.

Figure 2:
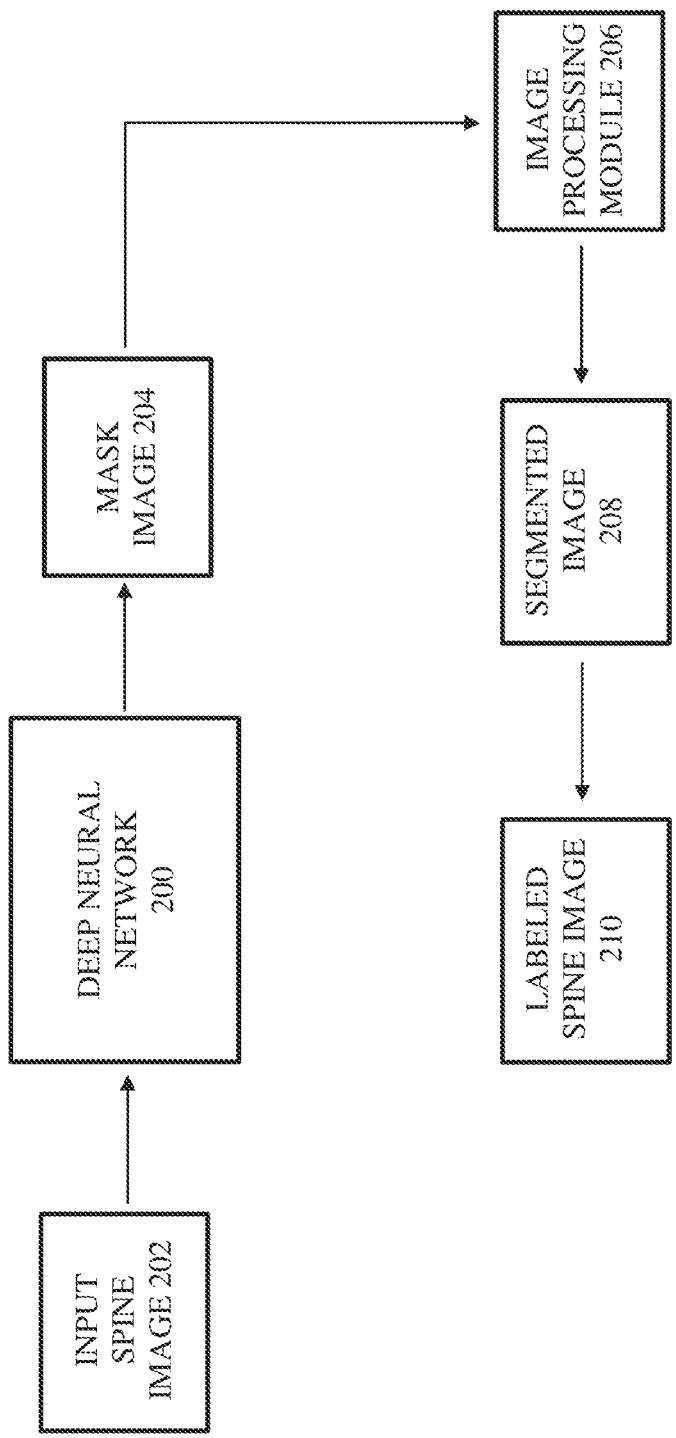
FIG. 2 is a schematic representation of a deep neural network processing an input spine image for labeling is shown in accordance with an embodiment.

As illustrated in FIG. 2, a schematic representation of a deep neural network 200 processing an input spine image for labeling is shown in accordance with an embodiment of the invention. An input spine image 202 is received by the deep neural network 200. The deep neural network 200 is a trained deep neural network. The input spine image 202 is generated by an imaging device based on scanning procedure performed on a subject as explained in conjunction with FIG. 1. In an embodiment, the input spine image 202 may be directly fed to the deep neural network 200 from the imaging device in a suitable format. In another embodiment, the input spine image 202 may be received as an input from a storage device capable of storing medical images generated by different imaging devices. However, it may be appreciated that the input spine image 202 may be received from any other source location according to other embodiments. The deep neural network 200 processes the input spine image 202 to generate a mask image 204. The masking process is performed by the deep neural network 200 based on the training it has undergone. The deep neural network 200 analyzes image features of the input spine image 202. The image features may include but are not limited to, pixel value, pixel intensity, location, color, orientation, tone, and shape of image components. As used herein, the term "image component" refers to each vertebra or part of a spine in the input spine image or a mask image. Based on this analysis of the image features, masking operation is performed on the input spine image 202 to generate the mask image 204. Referring to definition of a mask image given in conjunction with FIG. 1, the mask image (e.g. the mask image 204) has a region of interest which covers image pixels having a non-zero value (e.g., 1). The region of interest of the mask image 204 includes vertebral candidates or vertebrae of the spine. In some embodiments, the deep neural network 200 may be a convolution neural network having a U-net based architecture that has been trained to receive, as input, a plurality of spine images and corresponding mask images. In other embodiments, the deep neural network 200 may be a neural network having but not limited to, a holistically-nested neural network (HNN) architecture, or a full convolution neural network architecture (i.e. 3-dimensional), or a volumetric convolutional neural network architecture.

Figure 6:
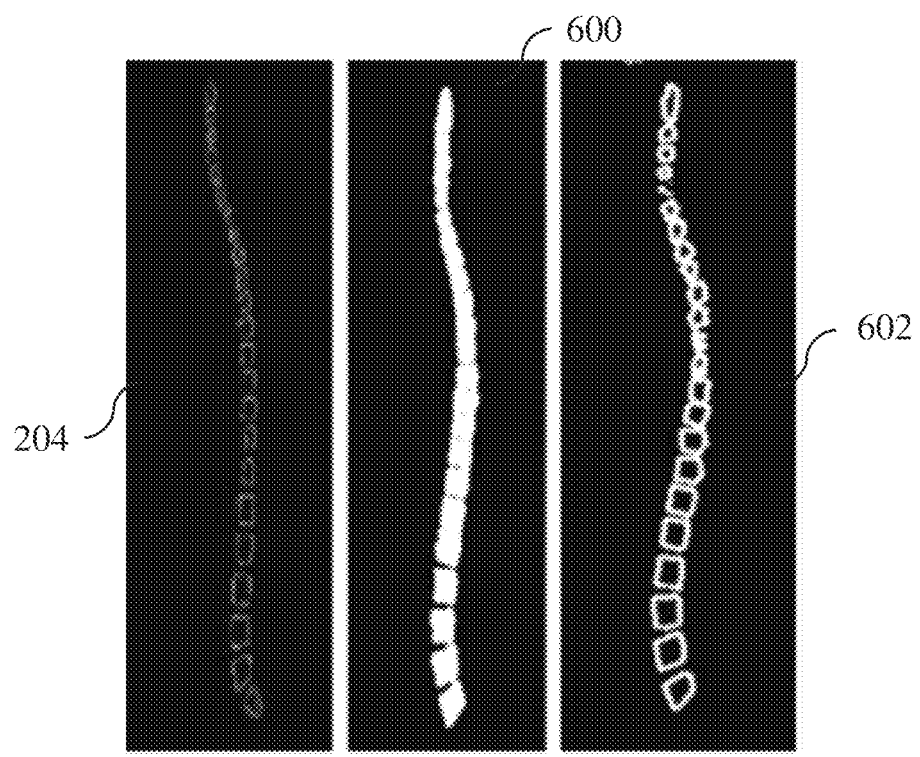
FIG. 6 schematically illustrates the segmentation of the mask image in accordance with an embodiment.

The mask image 204 is then processed by an image processing module 206 to generate a segmented image 208. The process of segmentation involves converting the mask image 204 into a plurality of image components, where a set of image pixels with certain image characteristics form an image component. The image components can be identified along with their boundaries by the image processing module 206. The mask image 204 may be segmented using different image processing techniques, such as but not limited to, edge detection technique, boundary detection technique, thresholding technique, clustering technique, compression based technique, histogram based technique or a combination thereof. After segmentation, further processing is performed to determine connection between the image components. For instance, whether a vertebra is connected to another vertebra or is there a presence of a fused vertebrae and so on. Thereafter, each image component is identified separately. This is explained in detail in conjunction with FIG. 6. The image processing module 206 then associates a component label with each image component of the segmented image 208. In an embodiment, component labels for image components may be predefined by a user. The component labels may be stored in a database. In an embodiment, the component labels may be stored in the form of table database (e.g. a look-up table) or using any other storing methodology or structure according to various embodiments of this disclosure. As will be further understood, in an embodiment the component label may be tagged to an image component of the segmented image 208. Then, each image component of the input spine image 202 is assigned a label based on a component label assigned to corresponding image component of the segmented image 208 or the mask image 204 to generate a labeled spine image 210. In some embodiments, the labeled spine image 210 may have labels provided as annotations to each image component. Alternatively, the labels may be provided as tags to each image component of the labeled spine image 210.

The labels may be stored in a database for example, in a look-up table format or any other data storing format according to various embodiments.

Figure 3:
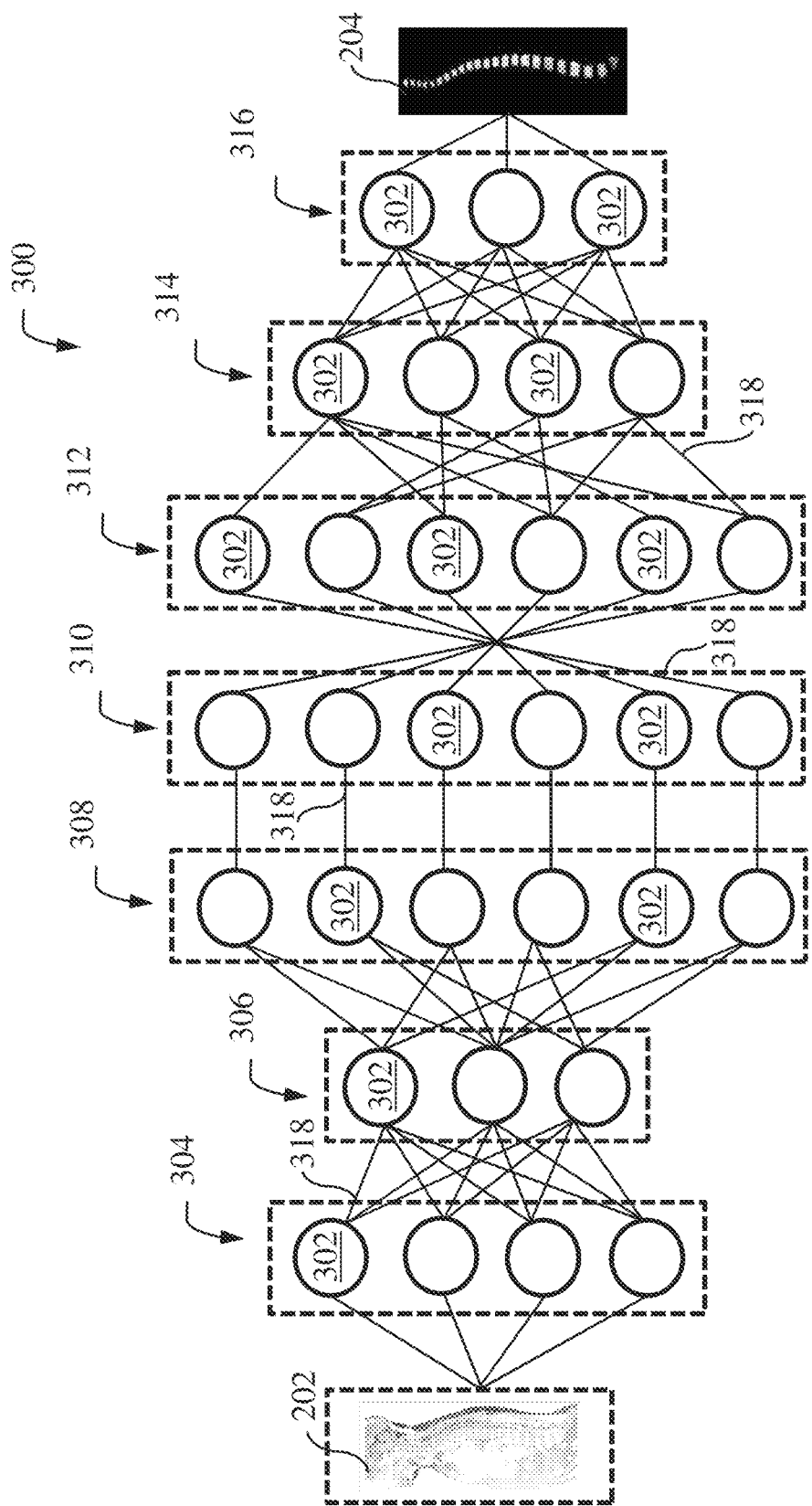
FIG. 3 illustrates a system that generates a mask image via a neural network in accordance with an embodiment.

Moving now to FIG. 3, embodiments of a system generate a mask image 204 from the input spine image 202 via a neural network 300 having one or more nodes/neurons 302 which, in embodiments, may be disposed into one or more layers 304, 306, 308, 310, 312, 314, and 316. The neural network 300 may be a deep neural network. As used herein with respect to neurons, the term "layer" refers to a collection of simulated neurons that have inputs and/or outputs connected in similar fashion to other collections of simulated neurons. Accordingly, as shown in FIG. 3, the neurons 302 may be connected to each other via one or more connections 318 such that data may propagate from an input layer 304, through one or more intermediate layers 306, 308, 310, 312, 314 to an output layer 316.

Figure 4:
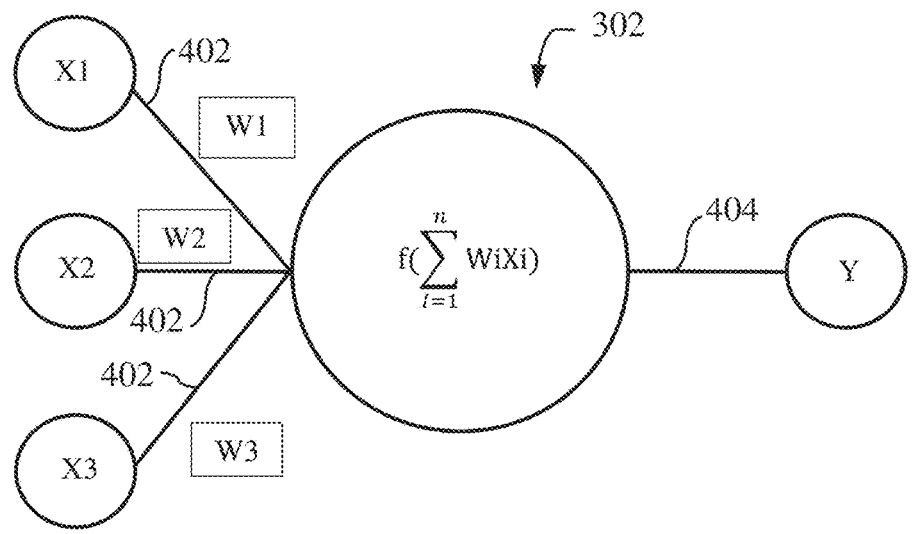
FIG. 4 illustrates neuron having a single output connection in accordance with an embodiment.

FIG. 4 shows input and output connections for a neuron in accordance with an exemplary embodiment. As shown in FIG. 4, the connections 318 of an individual neuron 302 may include one or more input connections 402 and one or more output connections 404. Each input connection 402 of a neuron 302 may be an output connection of a preceding neuron, and the output connections 404 of the neuron 302 may be an input connection of one or more subsequent neurons. While FIG. 4 depicts a neuron 302 as having a single output connection 402, it should be understood that neurons may have multiple output connections that transmit/pass the same value. In embodiments, the neurons 302 may be data constructs, e.g., structures, instantiated class objects, matrices, etc., and the input connections 318 may be received by the neuron 302 as weighted numerical values, e.g., floating point or integer values. For example, as further shown in FIG. 4, input connections X1, X2, and X3 may be weighted via weights W1, W2, and W3, respectively, summed, and sent/transmitted/passed as output connection Y. As will be appreciated, the processing of an individual neuron 302 may be represented, generally, by the equation:

$$Y = f\left(\sum_{i=1}^{n} WiXi\right)$$

where n is the total number of input connections 402 to the neuron 302. In embodiments, the value of Y may be based at least in part on whether the summation of WiXi exceeds a threshold. For example, Y may have a value of zero (0) if the summation of the weighted inputs fails to exceed a desired threshold.

As will be further understood, the input connections 402 of neurons 302 in the input layer 304 (FIG. 3) may be mapped to the input spine image 202, while the output connections 402 of the neurons 302 in the output layer 316 (FIG. 3) may be mapped to the mask image 204. As used herein, "mapping" an input connection 402 to the input spine image 202 refers to the manner by which the input spine image 202 affects/dictates the value of the input connections 402. Similarly, as also used herein, "mapping" an output connection 402 to the mask image 204 refers to the manner by which the value of the output connection 402 affects the mask image 204.

Accordingly, in embodiments, the acquired/obtained input spine image 202, or values derived therefrom, is passed/fed to the input layer 304 of the neutral network 300 and propagated through the layers 304, 306, 308, 310, 312, 314, and 316 such that mapped output connections 404 of the output layer 316 generates/corresponds to the mask image 204. The mask image 204 generated from the neural network 300 may be compared with the mask image 108 in the training image dataset. A loss coefficient such as Dice coefficient may be used for this purpose. The Dice coefficient may be represented generally by the equation:

$$DICE = (S \cap T)/(S \cup T)$$

where S is mask image volume and T is an output of the neural network 300. The value derived from this equation is called a Dice score that indicates the accuracy of the output of neural network 300. In other words, Dice score indicates the closeness of the mask image received as output from the neural network 300 to a mask image provided as part of the training image dataset.

Figure 5:
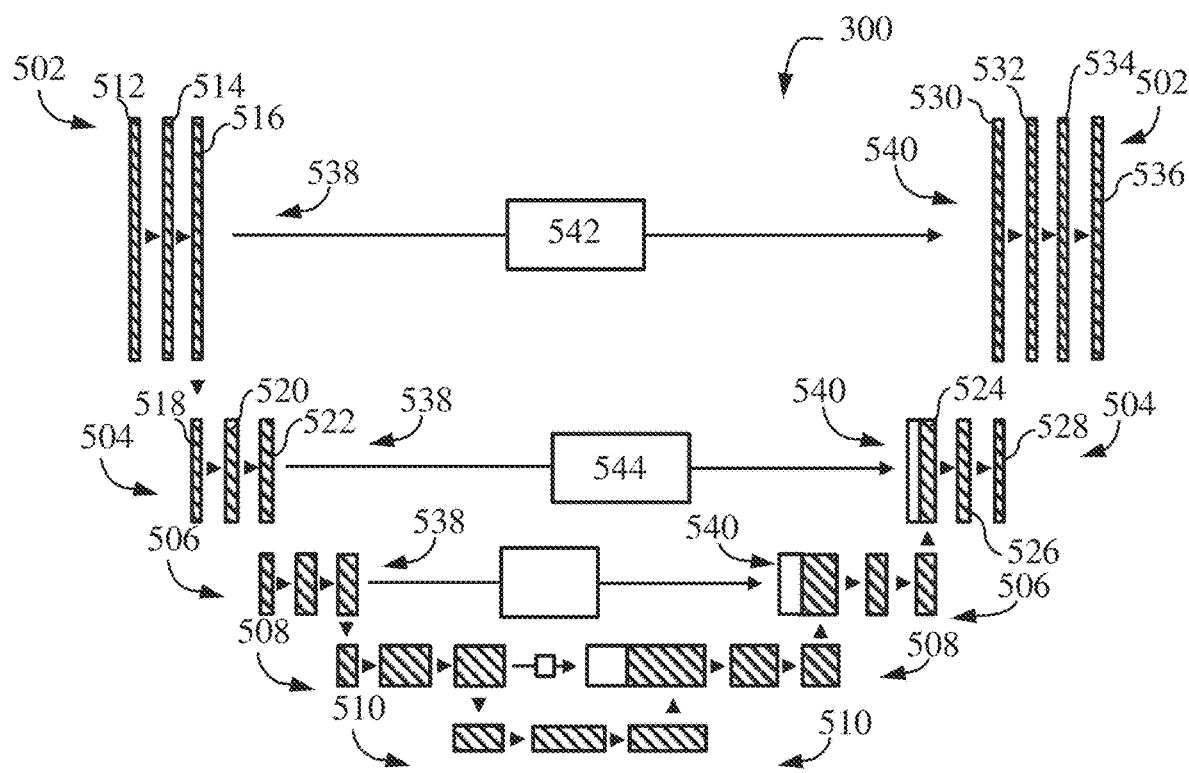
FIG. 5 illustrates a neural network which is a convolutional neural network based at least in part on a U-net architecture in accordance with an embodiment.

Turning to FIG. 5, in embodiments, the neural network 300 may be a convolutional neural network based at least in part on a U-net architecture. For example, in certain embodiments, the neural network 300 may include one or more layers 502, 504, 506, 508, 510 of feature maps 512, 514, 516, 518, 520, 522, 524, 526, 528, 530, 532, 534, 536. As will be appreciated, in embodiments, the layers 502, 504, 506, 508, 510 may have respective resolutions of 256×256, 128×128, 64×64, 32×32, and 16×16. As will be understood, the resolution of the layers 502, 504, 506, 508, 510 may be varied across embodiments. The feature maps 512, 514, 516, 518, 520, 522, 524, 526, 528, 530, 532, 534, 536 may respectively have two (2), sixty-four (64), sixty-four (64), one-hundred and twenty-eight (128), one-hundred and twenty-eight (128), three-hundred and twenty (320), one-hundred and twenty-eight (128), one-hundred and ninety-two (192), sixty-four (64), sixty-four (64), and one (1) filters/kernels. As will be further understood, the number of filters/kernels for each feature map may be varied across embodiments.

The feature maps of each layer may be divided into front-end groupings 538 and back-end groupings 540. In such embodiments, the input spine image 202, may be mapped/fed to an input feature map 512 in the front-end grouping 538 of a top layer 502. The input feature map 512 is then convoluted through one or more intermediate feature maps 512 and an end feature map 516 within the same grouping 540 and layer 502. A portion 542 of the end feature map 516 is then copied to an input feature map 530 of the back-end grouping 540 of the same layer 502, while the back-end feature map 516 is also pooled into the input feature map 518 of the front-end grouping 538 of a subordinate layer 504.

Similar to layer 502, the input feature map 512 of the subordinate layer 504 is then convoluted through one or more intermediate layers 504 and an end future map 522 within the same front-end grouping 538 and layer 540, with a portion 544 of the back-end feature map 516 being copied to an input feature map 512 of the back-end grouping 540 of the same layer 502, and with the back-end feature map 516 being pooled into the input feature map of the next subordinate layer 506.

The input layer 524 of the back-end grouping 540 of layer 504 convolutes through one or more intermediate feature maps 526 and an end feature map 528 of the same back-end grouping 540 and layer 504. The end feature map 528 is then un-pooled/up-scaled into input layer 530 and combined with the portion 542 copied from the end feature map 516 so as to fill/complete feature map 530. Feature map 530 is then convoluted through one or more intermediate feature maps 532, 534 and an end feature map 536, with end feature map 536 mapped to the mask image 204.

As will be further understood, the layers 506, 508, and 510 convolute, copy, pool, and un-pool/upscale in a manner similar to layers 502 and 504, with the exception of layer 510 foregoing pooling as it is the bottom layer. Further, while FIG. 5 depicts the neural network 300 as having five (5) feature map layers, e.g., 502, 504, 506, 508, and 510, it will be understood that the number of feature map layers may be varied across embodiments.

Referring back to processing the mask image 204 for segmentation using different image processing techniques by the image processing module 206 as described earlier in conjunction with FIG. 2, FIG. 6 schematically illustrates the segmentation of the mask image 204 in accordance with an embodiment of the disclosure. The mask image 204 is segmented into a plurality of image components to generate a segmented mask image 600. Thereafter, the image processing module 206 analyzes the segmented mask image 600 to determine any connection between the image components. For example, if the segmented mask image 600 is of whole spine anatomy, then connection between vertebrae may be identified. In this process, one or more feature parameters of each image component in the segmented mask image 600 may need to be analyzed. The one or more feature parameters may include for example, pixel value, pixel intensity, gradient resolution, shape of image component, location, color, orientation and tone of image pixels in the image component and of neighboring image pixels around the image component. If there are any connections between image components or if two or more image components are connected to each other, the image processing module 206 performs connection removal methodologies to separate the image components from each other. The connection removal methodologies that may be used include, but are not limited to, an erosion methodology, a morphological operator methodology and so on. Explaining by way of an example regarding connections between image components, in case of a mask image of the whole spine, the spinal cord connecting vertebrae (i.e., image components) of the spine may be visible as connecting all vertebrae. The image processing module 206 processes the segmented mask image 600 to remove this connection between vertebrae using the connection removal methodology. Thereafter, the image processing module 206 identifies boundaries of each image component by analyzing its feature parameters. Here, the image processing module 206 may use an edge detection technique, a boundary detection technique and so on, to extract individually each image component from the segmented mask image 600. The segmented mask image 600 with separated image components is shown as the segmented mask image 602. As illustrated in the segmented mask image 602 shown in FIG. 6, each image component is separated from each other.

The image processing module 206 processes the segmented mask image 602 to determine a position of each image component of the plurality of image components. In an embodiment, a centroid of each image component is determined by the image processing module 206. In case there is a connected image component such as fused vertebrae, a centroid associated with the connected image component is identified.

Figure 7:
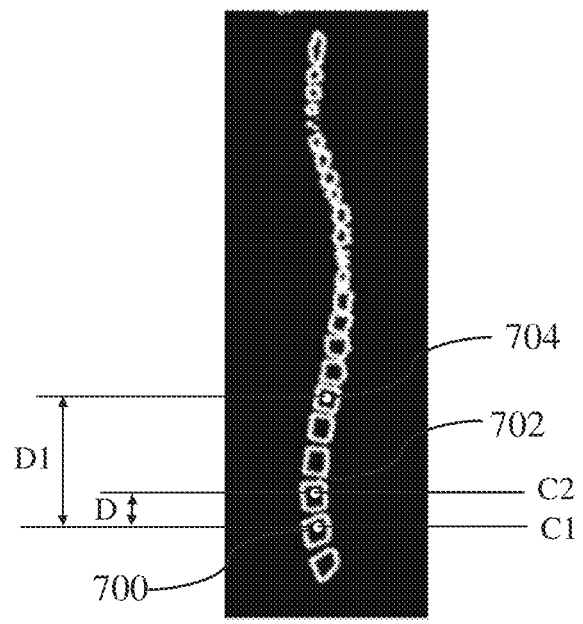
FIG. 7 illustrates image components of mask image with their centroids in accordance with an embodiment.
Figure 8:
FIG. 8 illustrates a labeled input spine image in accordance with an embodiment.

Thereafter, distance between centroid of a particular image component and centroid of other image components are determined to identify the position of the image component. Explaining by way of an example in other words, centroid of each vertebra is identified and then distance between the centroid of a vertebra and the centroid of neighboring vertebra is determined to identify the position of the vertebra. In another embodiment, distance between the centroid of a particular vertebra and centroids of all neighboring vertebrae may be determined to identify the position of the vertebra. As illustrated in FIG. 7, centroids of two image components 700 and 702 (i.e., vertebra) may be identified as C1 and C2. Once the centroids are identified, distance between the centroids C1 and C2 of the image components 700 and 702 is identified as D. Further, the centroid of the image component 704 may be identified as C3. The distance between the centroids C1 and C3 is determined as D1. Based on the distance between the centroids C1, C2 and C3 and the distances between these centroids, the position of the image components 700, 702 and 704 are identified. Similarly, position of other image components of the segmented mask image 602 may be also determined. Once position of image components is identified, the image processing module 206 associates component labels with the image components of the segmented mask image 602. The image processing module 206 analyzes these component labels, to label image components of the input spine image 202. In other words, the image processing module 206 may identify a component label associated with the image component of the segmented mask image 602, and then identify an image component of the input spine image 202 corresponding to the image component of the segmented mask image 602 having the component label. Based on this, the image processing module 206 labels the image component of the input spine image 202 to generate the labeled input spine image 210 as illustrated in FIG. 8. As illustrated in FIG. 8 according an exemplary embodiment, the labels given may be for example, 1-C3, 2-C4, 3-05, 5-C7, and 4-C6 assigned to cervical vertebrae, 6-T1, 7-72, 8-T3, 9-T4, 10-T5, 11-T6, 12-T7, 13-T8, 14-T9, 15-T10, 16-T11 and 17-T12 assigned thoracic vertebrae, L1-18, L2-19, L3-20, L4-21 and L5-22 assigned to lumbar vertebrae and S1-23 assigned to sacral vertebra. However, it is envisioned that any other format of labels may be assigned to the input spine image 202 according to various other embodiments.

Figure 9:
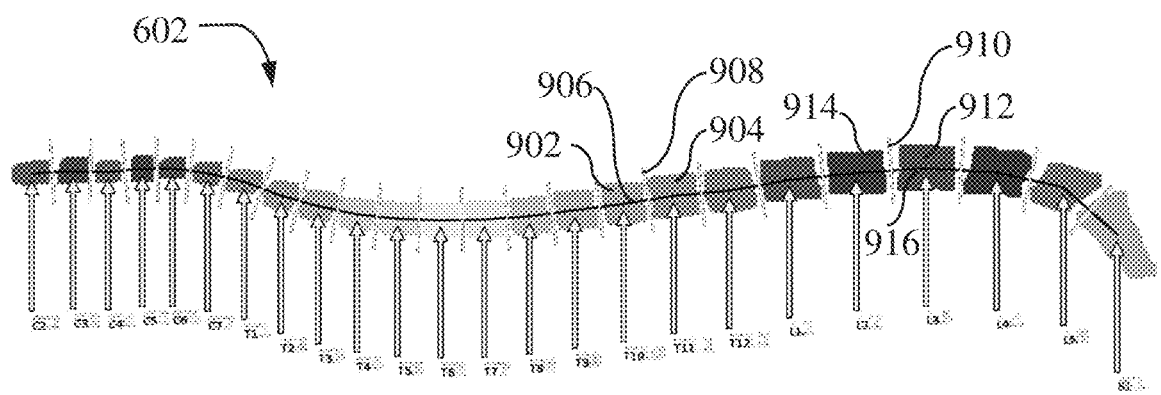
FIG. 9 illustrated a mask image with scan plane associated with image components according to an embodiment.

In another embodiment of the invention, centroids identified for the image components may be used by the image processing module 206 to determine a scan plane of each image component of the mask image 602 as shown in FIG. 9. The image processing module 206 may identify a line segment that connects centroids of two image components and then determines a plane that is perpendicular to line segment passing through these centroids. This plane may be considered as a potential scan plane. As illustrated in FIG. 9, considering an image component 902 and an image component 904, a line segment 906 may join or pass through the centroids of the image components. The image processing module may identify a plane 908 that is oriented perpendicular to the line segment 906. This plane 908 is identified as a scan plane for image component 904. Similarly, a plane 910 may be scan plane for image components 912 and 914 because the plane 910 is oriented perpendicular to a line segment 916 passing through the centroids of the image components 912 and 914.

Figure 10:
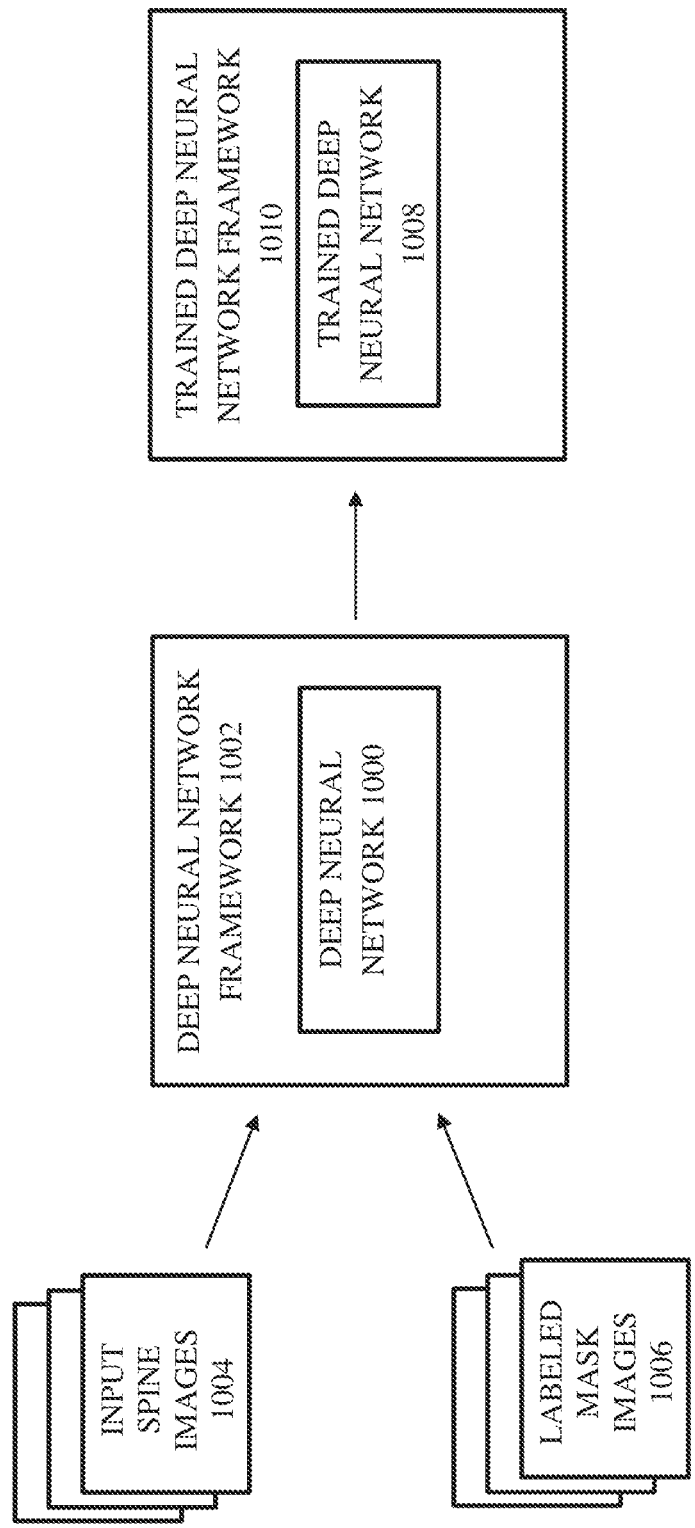
FIG. 10 illustrates a deep neural network of a deep neural network framework trained by a plurality of input spine images and a plurality of labeled mask images in accordance with an embodiment.
Figure 11:
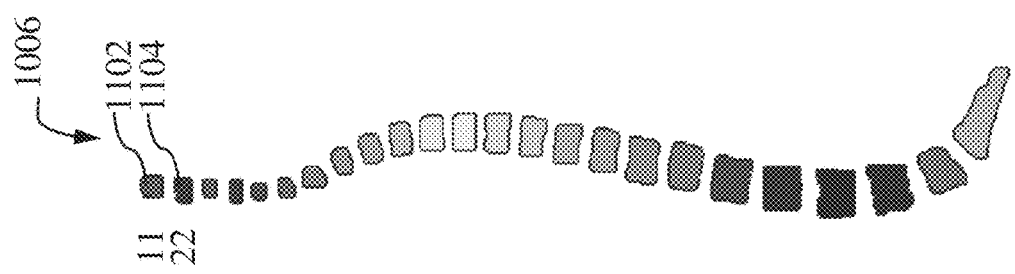
FIG. 11 illustrates a labeled mask image in accordance with an embodiment.

Moving now to FIG. 10 illustrating a deep neural network 1000 of a deep neural network framework 1002 trained by a plurality of input spine images (hereinafter referred to as "input spine images 1004") and a plurality of labeled mask images (hereinafter referred to as "labeled mask images 1006") in accordance with an embodiment of the disclosure. The deep neural network 1000 may be a deep convolution neural network for example, R-CNN, or any other deep convolution neural network. Each input spine image 1004 may have a corresponding labeled mask image 1006. The labeled mask images 1006 include mask images having component labels assigned to each image component of the mask image. In an embodiment, each image component may be assigned a component label to identify it from others. The component label may be a unique label which may vary based on image characteristics of the image component. The image characteristics may include, but not limited to, pixel value, pixel color, and pixel intensity of image pixels of an image component. For example, considering the case of mask image of the spine which includes cervical vertebrae, thoracic vertebrae, lumbar vertebrae, sacral vertebrae and coccyx, image pixels associated with cervical vertebrae, thoracic vertebrae, lumbar vertebrae, sacral vertebrae and coccyx may have different image characteristics. As shown in FIG. 11, each vertebra may have a different image pixel color, grayscale, or intensity, and a unique label may be assigned to each vertebra based on the pixel color, grayscale, or intensity. The component label may be for instance, 11 for a vertebra 1102 and 22 for a vertebra 1104. Here image characteristics (e.g. pixel intensity) of the vertebra 1102 and the vertebra 1104 are different. In another embodiment, each vertebra may be labeled based on color of their image pixels. In other words, the color of image pixels of a vertebra acts as its identification and therefore acts as its label. The component label may be assigned to each image component by a user.

In a labeled mask image 1006, in order to label an image component, a position associated with the image component may need to be determined. In an embodiment, position of the image component is determined by identifying a centroid of the image component. The deep neural network 1000 learns the centroid of each image component. It may be appreciated that even though determining the centroid of the image component to identify position information of the image component is disclosed as part of an embodiment, position information of the image component may be identified using any other position parameters according to various other embodiments. For example, a position parameter may be a point along an edge of the image component. The deep neural network 1002 trains on the input spine images 1004 and the labeled mask images 1006 to generate a trained deep neural network 1008 as part of a trained deep neural network framework 1010.

Figure 12:
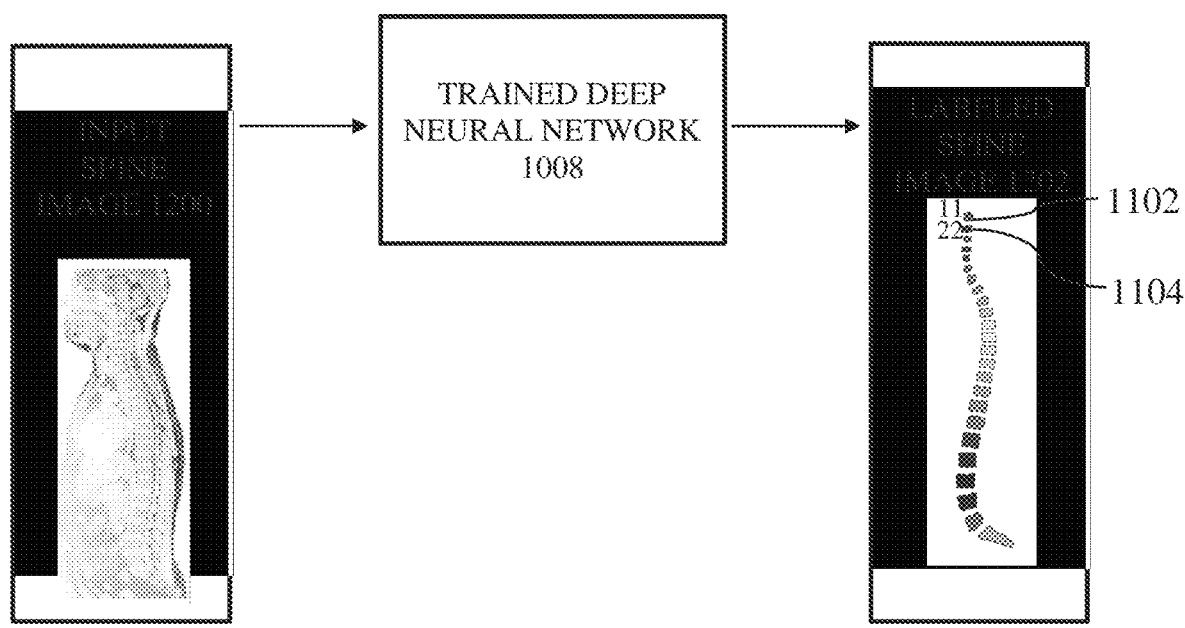
FIG. 12 illustrates a trained neural network processing an input spine image to generate a labeled spine image in accordance with an embodiment.

The trained deep neural network 1008 may process the input spine image 1200 to generate a labeled spine image 1202 as shown in FIG. 12 according to an embodiment of the disclosure. When the input spine image 1200 is received, the trained deep neural network 1008 identifies a position information of each image component of the input spine image 1200. In an embodiment, position information is indicated by a centroid. Thereafter, based on a centroid of the image component a corresponding label is assigned to the image component of the input spine image 1200. In an embodiment, to explain in detail, the trained deep neural network 1008 may generate a mask image from the input spine image 1200. Then a position of an image component of the mask image is determined based on the training which the trained deep neural network had as explained in conjunction with FIG. 10. The position of the image component of the mask image is mapped with a position of an image component of the input spine image 1200. Thereafter, a component label is associated with the image component of the mask image based on the component labels assigned to corresponding image component of the labeled mask image 1006. Based on this association, the labels are assigned to the image components of the input spine image 1200 to generate the labeled spine image 1202. In this process, the mask image 1006 need not be segmented thereby avoiding any processing overhead for segmentation.

Figure 13:
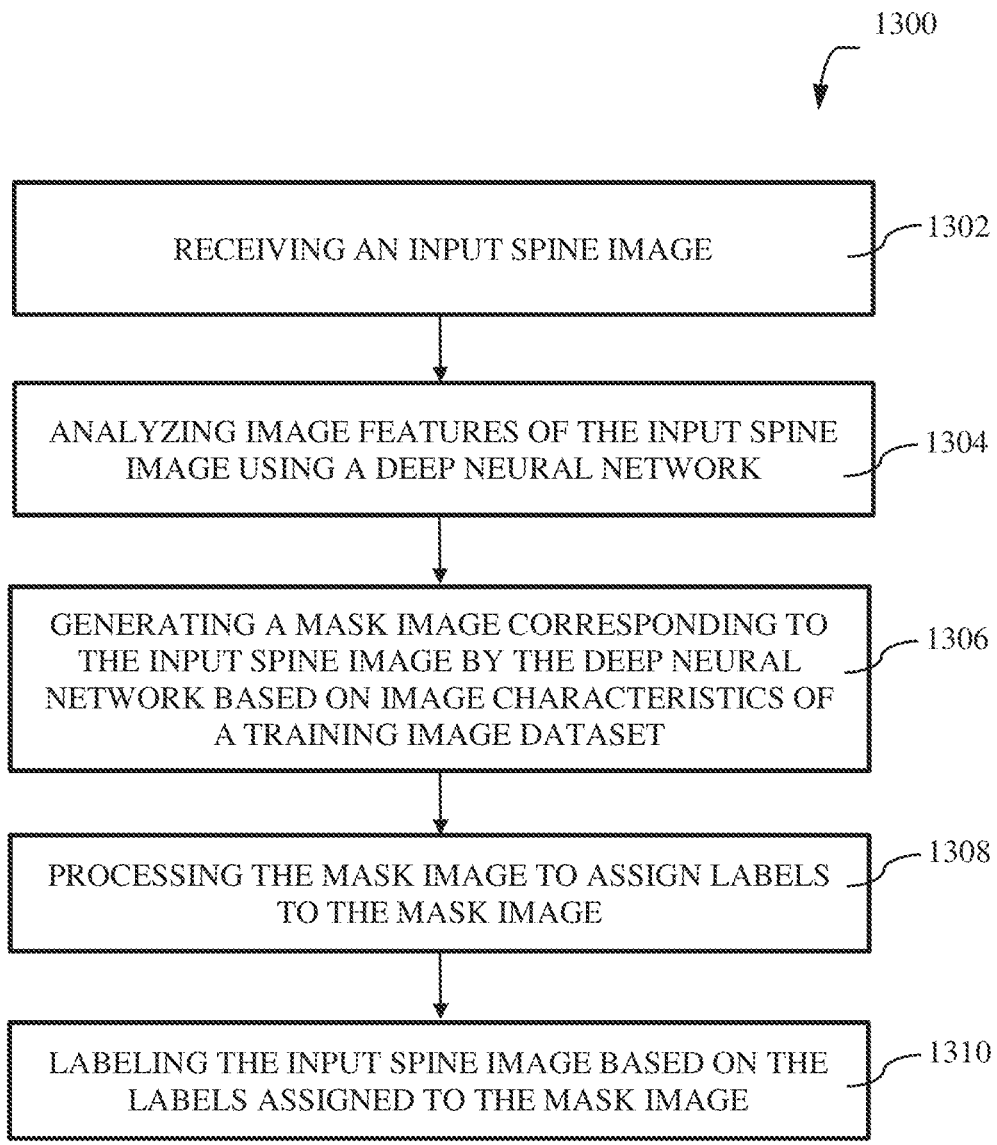
FIG. 13 illustrates a method of labeling a spine image in accordance with an embodiment.

Moving now to FIG. 13, a method 1300 of labeling a spine image in accordance with an embodiment is disclosed. The method 1300 includes receiving an input spine image at block 1302. The input spine image may be spine image generated from an imaging device or stored in a storage device. The input spine image may be associated with a whole spine anatomy. Image features of the input spine image is analyzed using a deep neural network at block 1304. Thereafter, a mask image corresponding to the input spine image is generated by the deep neural network based on image characteristics of a training image dataset at block 1306. The training image dataset includes a plurality of spine images and a plurality of mask images. The mask image may have a region of interest comprising vertebral candidates of the spine.

The training image dataset is provided to train the deep neural network. The deep neural network is trained on weights assigned to image characteristics of the spine image by correlating image characteristics of the spine image and the image characteristics of the mask image at block 1308. The deep neural network learns the relationship between the spine image and a corresponding mask image of the plurality of mask images by the deep neural network based on the training. At block 1308, the mask image is processed to assign component labels. The method of processing the mask image is described in conjunction with FIG. 14. Then the input spine image is labeled based on the component labels associated with the mask image at block 1310.

Figure 14:
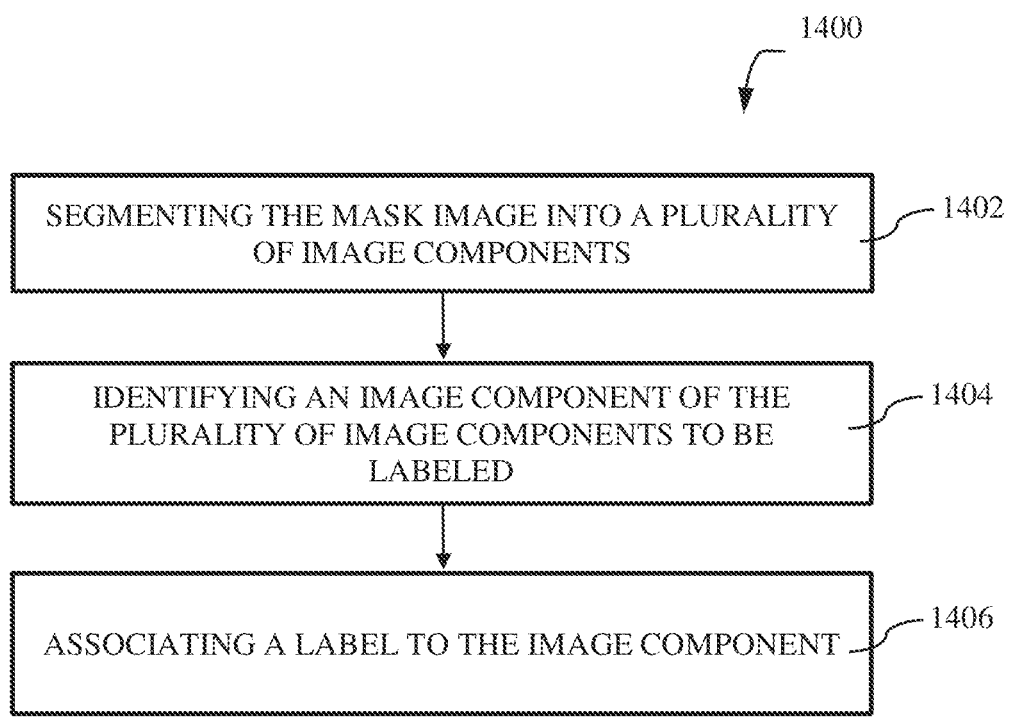
FIG. 14 illustrates a method for labelling a spine image in accordance with an embodiment.

FIG. 14 illustrates a method 1400 of processing the mask image according to an embodiment of the disclosure. The method 1400 includes segmenting the mask image into a plurality of image components at block 1402. For example, image components in the mask image includes vertebrae. In the process of segmentation, one or more feature parameters of each image component of the plurality of image components are analyzed. The one or more feature parameters may include, for example, pixel value, pixel intensity, gradient resolution, shape of image component, location, color, orientation and tone. Then, each image component is extracted individually from the mask image based on this analysis. At block 1404, an image component of the plurality of image components is identified to be labeled. In order to identify the image component, a position of the image component is determined. In an embodiment, the position of the image component is determined by identifying its centroid. Thereafter, at block 1406 a component label is associated with each image component of the mask image.

Figure 15:
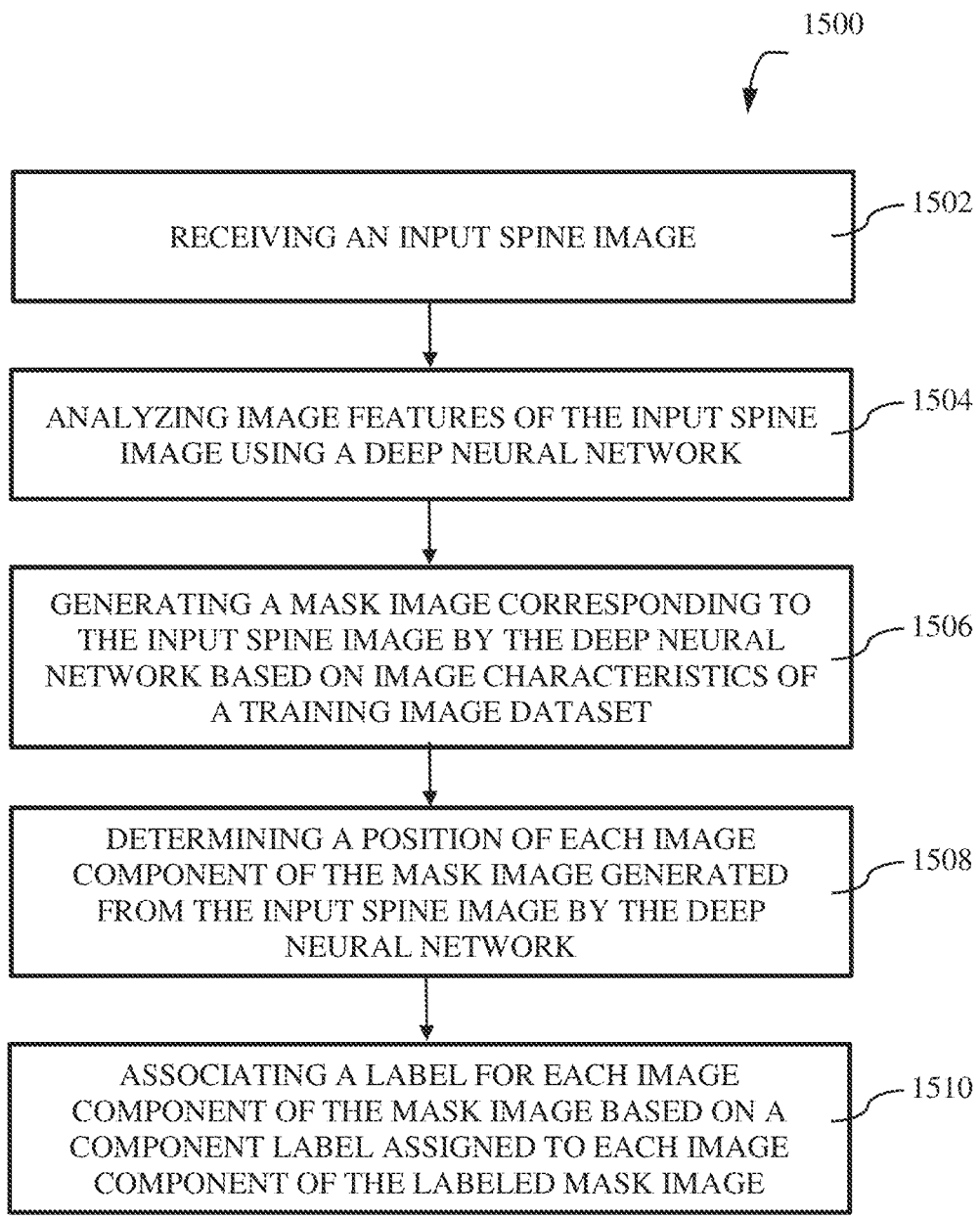
FIG. 15 illustrates a block diagram of a server for training the neural network of FIG. 1, in accordance with an exemplary embodiment.

Now referring to FIG. 15, a method 1500 for labelling a spine image according to an embodiment of the disclosure is disclosed. The method 1500 includes receiving an input spine image at block 1502. Image features associated with the input spine image is analyzed using a deep neural network at block 1504. In various embodiments, the image features are analyzed at level of image pixels in the input spine image by the deep neural network. A mask image corresponding to the input spine image is generated by the deep neural network based on image characteristics of training image dataset at block 1504. The training image dataset includes a plurality of spine images and a plurality of labeled mask images which is used for training the deep neural network. A labeled mask image of the plurality of labeled mask image have labels assigned or tagged to each image components. Then, position of each image component of the mask image is determined by the deep neural network at block 1506. Each image component of the mask image is associated with a component label based on the component label assigned to each image component of the labeled mask image at block 1508.

Figure 16:
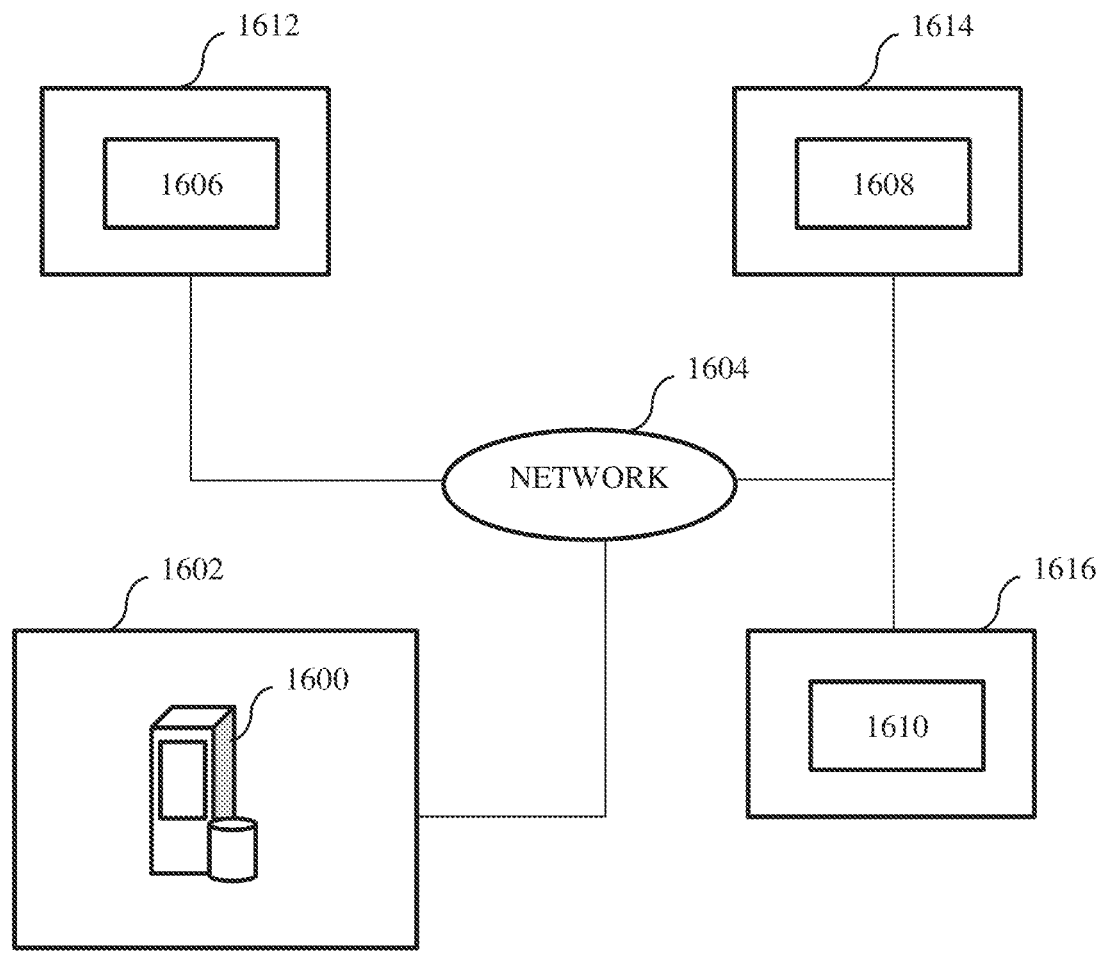
FIG. 16 illustrates a block diagram of a server for training the neural network of FIGS. 1, 2 and 10, in accordance with an exemplary embodiment.

An instantiation of the neural network (112, 200, 1000) may be trained on a server 1600, disposed at a first location 1602, e.g., a research center and/or imaging system manufacturing site as shown in FIG. 16 according to an exemplary embodiment. Upon being trained to the point where the neural network (112, 200, 1000) generates a mask image and a labeled spine image from an input spine image that are within acceptable error limits, e.g., labeled spine image that are suitable for medical diagnostic purposes and prescription, the weights and learnings may be sent over a network 1604, e.g., the Internet and a cloud network, to one or more imaging systems 1606, 1608, 1610, which may be similar to imaging system 110 (FIG. 1), disposed across one or more sites 1612, 1614, 1616, e.g., medical facilities such as hospitals. Once received, the weights and learnings may be applied by instances/instantiations of the neural network 1604 within the systems 1606, 1608, 1610. In other words, in embodiments, the neural network 1604 may be trained at a research facility 1616 with the weights being pushed over a network 1604 to various imaging systems 1606, 1608, 1610 each running/executing an instance of the neural network 1604.

In addition, an operator (e.g. technician or radiologist) may send rejected or approved mask images or labeled mask images from the imaging systems 1606, 1608, 1610 at different sites to the server 1600 to added as part of training image dataset. In an embodiment, these additional rejected and approved mask image or labeled spine images are reviewed by experts added into the training image dataset in the server 1600. These additions to training image dataset helps in refining resident deep neural networks running in the imaging system 1606, 1608, 1610.

Although instantiation of the neural network (112, 200, 1000) is described as part of a distributed network including multiple imaging systems with reference FIG. 16, it should be understood that the neural network (112, 200 or 1000) can be implemented in a single imaging system or device for performing method of labeling a spine image according to an embodiment of an invention.

Various embodiments of the systems and methods for labeling an input spine image is described hereinabove enabling fully automated spine annotation with possible manual correction by user. This methodology reduces the labelling time required and increase productivity of the technician working on the spine image. Further, the technician or radiologist can prepare medical reports much more efficiently due to this fully automated spine annotation.

The above-described advantages should be regarded as illustrative rather than restrictive. It is to be understood that not necessarily all such objects or advantages described above may be achieved in accordance with any particular embodiment. Thus, for example, those skilled in the art will recognize that the systems and techniques described herein may be embodied or carried out in a manner that achieves or improves one advantage or group of advantages as taught herein without necessarily achieving other objects or advantages as may be taught or suggested herein.

It may be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid-state drive, optical disk drive, and the like. The storage device may also be other similar means for loading computer programs or other instructions into the computer or processor.

As used herein, the term "computer," "subsystem," "controller circuit," "circuit," or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "controller circuit".

The computer, subsystem, controller circuit, circuit executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, subsystem, controller circuit, and/or circuit to perform specific operations such as the methods and processes of the various embodiments. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation. For example, a controller circuit, circuit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation). For the purposes of clarity and the avoidance of doubt, a general-computer (which may become "configured to" perform the task or operation if appropriately programmed) is not "configured to" perform a task or operation unless or until specifically programmed or structurally modified to perform the task or operation.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects.

This written description uses examples to disclose the invention, including the best mode, and also to enable any person skilled in the art to practice the invention, including making and using any computing system or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A method for automatically labeling a spine image, the method comprising:
   receiving an input spine image;
   analyzing, by a deep neural network, image features of the input spine image;
   generating, by the deep neural network, a mask image corresponding to the input spine image based on image characteristics of a training image dataset by adjusting pixel values of non-spinal material in the input spine image while maintaining pixel values of spinal material in the input spine image to display the spinal material and obscure the non-spinal material in the input spine image, wherein a region of interest in the mask image comprises vertebral candidates of the spine, wherein the training image dataset comprises a plurality of spine images and a plurality of corresponding mask images;
   associating labels with a plurality of image components of the mask image corresponding to the input spine image; and
   labeling the input spine image based on the labels associated with the mask image.

2. The method of claim 1, wherein the input spine image is of a whole spine anatomy.

3. The method of claim 1, further comprising:
providing the training image dataset to the deep neural network;
training the deep neural network on weights assigned to the image characteristics by correlating the image characteristics of each spine image in the training image dataset with a corresponding mask image in the training image dataset; and
learning, by the deep neural network, a relationship between the spine image and the corresponding mask image in the training image dataset based on the training.

4. The method of claim 1, further comprising:
segmenting the mask image corresponding to the input spine image into the plurality of image components; and
identifying each image component of the plurality of image components to be labeled.

5. The method of claim 4, further comprising determining connections between image components of the plurality of image components.

6. The method of claim 4, wherein segmenting the mask image comprises:
analyzing at least one feature parameter of each image component of the plurality of image components; and
extracting each image component individually from the mask image.

7. The method of claim 6, further comprising determining a position of each image component of the plurality of image components for labeling each image component.

8. The method of claim 1, wherein each mask image of the plurality of mask images in the training image dataset is a labeled mask image comprising a plurality of image components.

9. The method of claim 8, wherein each image component of the plurality of image components of the labeled mask image is assigned a component label based on image characteristics of the image component, the method further comprising:
training the deep neural network on position of each image component based on the component label and position information of each image component.

10. The method of claim 9, further comprising:
determining a position of each image component of the mask image corresponding to the input spine image, wherein associating labels with the plurality of components comprises associating a label for each image component of the mask image based on the component label assigned to each image component of the labeled mask image.

11. A method of training a deep neural network, the method comprising:
providing a training image dataset to the deep neural network, the training image dataset comprising a plurality of spine images and a plurality of corresponding mask images, wherein each spine image of the plurality of spine images is of a whole spine anatomy, and wherein each mask image of the plurality of mask images is generated by adjusting pixel values of non-spinal material in an input spine image while maintaining pixel values of spinal material in the input spine image to display the spinal material and obscure the non-spinal material in the input spine image;
training the deep neural network on weights assigned to the image characteristics by correlating the image characteristics of each spine image in the training image dataset with a corresponding mask image in the training image dataset, wherein a region of interest in the mask image comprises vertebral candidates of a spine; and
learning, by the deep neural network, a relationship between the spine image and the corresponding mask image in the training image dataset based on the training.

12. The method of claim 11, wherein each mask image of the plurality of mask images is a labeled mask image comprising a plurality of image components, the method further comprising:
assigning a component label to each image component of the plurality of image components based on image characteristics of the image component; and
learning a position of each image component based on the component label and position information of each image component.

13. A system for automatically labeling a spine image, the system comprising:
a deep neural network framework configured to:
analyze image features of an input spine image;
generate a mask image corresponding to the input spine image based on image characteristics of a training image dataset by adjusting pixel values of non-spinal material in the input spine image while maintaining pixel values of spinal material in the input spine image to display the spinal material and obscure the non-spinal material in the input spine image, wherein a region of interest in the mask image comprises vertebral candidates of the spine, wherein the training image dataset comprises a plurality of spine images and a plurality of corresponding mask images; and
associate labels with a plurality of image components of the mask image corresponding to the input spine image; and
label the input spine image based on the labels associated with the mask image.

14. The system of claim 13, wherein the deep neural network framework is further configured to:
receive the training image dataset;
train on weights assigned to the image characteristics by correlating the image characteristics of each spine image in the training image dataset with a corresponding mask image in the training image dataset; and
learn a relationship between the spine image and the corresponding mask image in the training image dataset based on the training.

15. The system of claim 13, wherein the deep neural network framework is further configured to:
segment the mask image corresponding to the input spine image into a plurality of image components; and
identify the plurality of image components to be labeled.

16. The system of claim 15, wherein the deep neural network framework is further configured to determine connection between image components of the plurality of image components.

17. The system of claim 15, wherein the deep neural network framework is further configured to:
analyze at least one feature parameter of each image component of the plurality of image components;
extract each image component individually from the mask image; and
determine a position of each image component of the plurality of image components for labelling each image component.

18. The system of claim 13, wherein each mask image of the plurality of mask images is a labeled mask image comprising a plurality of image components, wherein each image component is assigned a component label based on image characteristics of the image component, the deep neural network framework is further configured to:
- train on position of each image component based on the component label and position information of each image component.

19. The system of claim 18, wherein the deep neural network framework is further configured to:
- determine a position of each image component of the mask image generated from the input spine image by the deep neural network; and
- associate a label for each image component of the mask image based on the component label assigned to each image component of the labeled mask image.

* * * * *